(12) United States Patent
Terradas et al.

(10) Patent No.: US 7,421,927 B2
(45) Date of Patent: Sep. 9, 2008

(54) RATIO REGULATION MECHANISM FOR AN ACTION LEVER

(75) Inventors: Jaume Prat Terradas, Barcelona (ES); David Gras Alonso, Sant Cugat del Valles (ES); Daniel M. Uribe-Echebarria, San Cugat Del Valles (ES)

(73) Assignee: Fico Cables, S.A., Mollet del Valles (ES)

( * ) Notice: Subject to any disclaimer, the term of this patent is extended or adjusted under 35 U.S.C. 154(b) by 472 days.

(21) Appl. No.: 10/535,139

(22) PCT Filed: Nov. 24, 2003

(86) PCT No.: PCT/EP03/13177

§ 371 (c)(1),
(2), (4) Date: Dec. 27, 2005

(87) PCT Pub. No.: WO2004/048169

PCT Pub. Date: Jun. 10, 2004

(65) Prior Publication Data

US 2006/0248978 A1 Nov. 9, 2006

(30) Foreign Application Priority Data

Nov. 22, 2002 (DE) .............................. 102 54 586

(51) Int. Cl.
G05G 1/30 (2008.04)

(52) U.S. Cl. ...................................................... 74/512

(58) Field of Classification Search ................... 74/512, 74/516–518, 560
See application file for complete search history.

(56) References Cited

U.S. PATENT DOCUMENTS

| 3,646,830 A | 3/1972 | Shrock |
| 3,727,481 A | 4/1973 | Nicholson |
| 4,989,474 A | 2/1991 | Cicotte et al. |
| 5,010,782 A * | 4/1991 | Asano et al. ................... 74/512 |

(Continued)

FOREIGN PATENT DOCUMENTS

DE 199 23 697 11/2000

(Continued)

OTHER PUBLICATIONS

International Search Report, counterpart PCT application.

(Continued)

*Primary Examiner*—Chong H Kim
(74) *Attorney, Agent, or Firm*—Marshall, Gerstein & Borun LLP

(57) ABSTRACT

The invention relates to a ratio regulating mechanism for an manually actuated action lever, like a hand brake lever or a pedal, in particular for the use in a motor vehicle, which comprises a mounting (2), an action lever arm (20) and a rotational shaft (15) for rotably mounting of the action lever arm (20) at the mounting (2), wherein the rotational shaft (15) is relocatably mounted at the action lever arm (20) and relocatably mounted at the mounting (2). Further, the ratio regulating mechanism comprises a first adjustment means (19, 21) for the relocation of the rotational shaft (15) in relation to the action lever arm (20) and a second adjustment means (22, 23) for the relocation of the rotational shaft (15) in relation to the mounting (2).

20 Claims, 4 Drawing Sheets

U.S. PATENT DOCUMENTS

Figure 1:
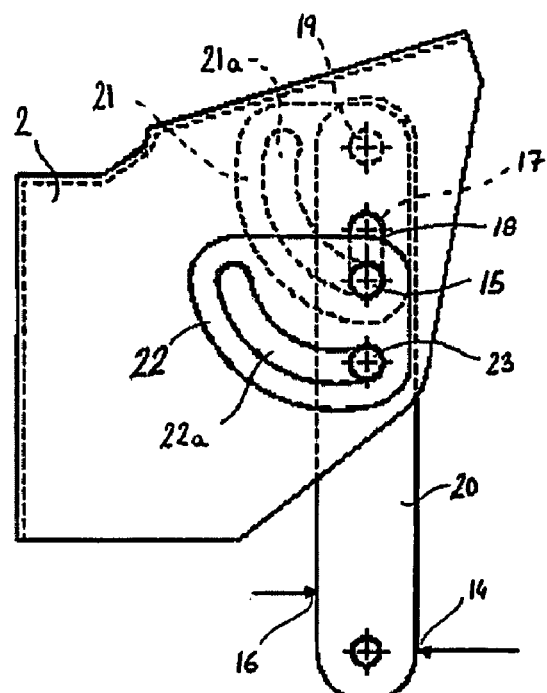

| | | | |
|---|---|---|---|
| 5,086,663 A * | 2/1992 | Asano et al. | 74/512 |
| 5,460,061 A | 10/1995 | Redding et al. | |
| 5,832,784 A | 11/1998 | McCallips et al. | |
| 6,151,985 A * | 11/2000 | Garber et al. | 74/512 |
| 6,173,625 B1 * | 1/2001 | McFarlane et al. | 74/512 |
| 6,453,767 B1 * | 9/2002 | Willemsen et al. | 74/512 |
| 6,584,871 B2 * | 7/2003 | Burton et al. | 74/512 |
| 6,840,132 B2 | 1/2005 | Gohrbandt et al. | |
| 2004/0040403 A1 * | 3/2004 | Hayashihara et al. | 74/512 |

FOREIGN PATENT DOCUMENTS

| | | |
|---|---|---|
| DE | 100 17 531 | 11/2001 |
| DE | 200 22 852 | 5/2002 |
| EP | 0 410 815 | 1/1991 |
| EP | 1 251 417 | 10/2002 |
| FR | 2 739 947 | 4/1997 |
| GB | 1092314 | 11/1967 |
| JP | 59-180713 | 10/1984 |

OTHER PUBLICATIONS

International Preliminary Examination Report, counterpart PCT application.

* cited by examiner

RATIO REGULATION MECHANISM FOR AN ACTION LEVER

CROSS-REFERENCE TO RELATED APPLICATION

This is the U.S. National Phase of International Application No. PCT/EP2003/013177filed 22 Nov. 2003, the entire disclosure of which is incorporated by reference.

TECHNICAL FIELD

The present invention relates to a ratio regulating mechanism for an action lever for changing the forces and paths transmitted by the lever. The present invention in particular relates to a ratio regulating mechanism for a manually actuated action lever of a motor vehicle, like a hand brake or a pedal with adjustable lever ratio.

PRIOR ART

In many fields of mechanics, e.g. in mechanical engineering or motor-vehicle construction, there is the problem of adjusting a lever in that various actuation forces and actuation paths are possible. This may be caused by an action lever for manual actuation having to be actuatable by persons of different strength. In this respect, it might be desirable to be able to adjust the required actuation force of a handbrake lever in a motor vehicle to the respective driver. A strong driver might want to have a short actuation path with a correspondingly high force whilst a weaker driver might desire a longer actuation path with lesser force.

The prior art describes manually actuated action levers that change their respective lever ratio during the actuation. The GB 1,092,314 describes a variable ratio lever mechanisms for a handbrake which uses a lever arm mechanics to produce in an initial portion of a stroke a large output movement with a low output force, and in a final portion of the stroke a high output force. That means, the lever arm of the action lever changes during the stroke. The U.S. Pat. No. 3,727,418 shows the opposite effect. Here, the initial portion of the stroke has a high output force and the final portion of the stroke a low output force. However these action levers do not show an adjustment of the lever ratio to the user.

Also in the case of pedals of motor vehicles, which are manually actuated by foot, it might be desirable to be able to adjust actuation forces and actuation paths.

Many different solutions for adjusting a pedal to a driver are described in the prior art. DE 199 23 697 A1 and DE 200 22 852 U1, for example, describe pedals which can be adjusted by the adjustment of the pedal to the respective driver. Therein, the lever arm of the pedal is extended in that pedal is extended diagonally downwards in the direction towards the driver. From these solutions it is obvious that the lever ratios change drastically after adjustment. In the adjustment for small drivers, the pedal has a long lever so that it has to be actuated with a long actuation path and correspondingly small force.

It is thus desirable in such cases that the lever ratios are maintained approximately constant. It is desirable that small and large drivers have the same actuation path and the same actuation force in the actuation of the pedal.

Other pedals with a variable lever ratio are described in the U.S. Pat. No. 3,646,830 or the JP 59 180 713 A wherein the lever ratio changes during the stroke of the pedal. In these documents the lever ratio becomes larger while increasing the actuation, that means the stroke of the pedal.

Thus, the problem on which the invention is based consists of providing an improved manually actuated actuation lever wherein the lever ratio is adjustable to the user. On the one hand, it is desired to have a regular actuation lever, wherein the lever ratio can be adjusted to the user. On the other hand, it is desired to have an action lever which provides the same lever ratio for all users after a geometric adjustment of the actuation lever to users of different size.

SUMMARY OF THE INVENTION

The invention on which the problem is based is according to the invention solved by a ratio regulating mechanism for an action lever according to patent claim 1.

The ratio regulating mechanism for an manually actuated action lever, in particular for the use in a motor vehicle, comprises a mounting, an action lever arm and a rotational shaft for rotably mounting of the action lever arm at the mounting, wherein the rotational shaft is relocatably mounted at the action lever arm and relocatably mounted at the mounting. Further, the ratio regulating mechanism comprises a first adjustment means for the relocation of the rotational shaft in relation to the action lever arm and a second adjustment means for the relocation of the rotational shaft in relation to the mounting.

Therefore, the action lever arm rotates around the rotational shaft. Thus, it is possible to adjust the action lever in that the ratio between the lever arms of input force $F_1$ and output force $F_2$, which act on the arm, is variable, wherein the forces $F_1$ and $F_2$ are induced at the same positions before and after the relocation of the rotational shaft.

The ratio of the forces $F_1$ and $F_2$ is its quotient or its relation. In an action lever the ratio depends on the geometrical conditions of the force inducing points and rotation points. In our case the ratio is the quotient of the distances of the lines of forces of $F_1$ and $F_2$ to the rotational shaft, which defines the rotation axis of the action lever arm. By relocating the rotational shaft the distances to the lines of forces of $F_1$ and $F_2$ are varied. Thereby, also the quotient of this distances varies. That leads to a variation of the lever ratio of the action lever.

Preferably, the first adjustment means and the second adjustment means are adjustable, so that during the relocation of the rotational shaft the position of the action lever arm in relation to the mounting is maintained. Since the position of the action lever arm in relation to the fixed support is maintained, the force inducing points on the action lever arm can be maintained. In particular the hand grip of e.g. a hand-brake lever is then always at the same position. Moreover, the position of e.g. a foot piece of a pedal is not changed.

Preferably, the relocation of the rotational shaft by said first adjustment means occurs in an opposite direction to the relocation of the rotational shaft by said second adjustment means.

Preferably, the first adjustment means and the second adjustment means are simultaneously actuated. Therefore, the action lever arm may not move with respect to the mounting during adjustment. Every intermediate adjustment position is directly obtained during adjustment.

Preferably, the first adjustment means is mounted at the action lever arm. Further preferred, the second adjustment means is mounted at the mounting. Thus, only the rotational shaft of the actuation lever is displaced with respect to the mounting and not the action lever itself. The first adjustment means will at least partially move together with the action lever arm if the action lever arm is actuated.

Preferably, the action lever arm comprises an elongated guide and the mounting comprises an elongated guide for the relocatable mounting of the rotational shaft. The position of the rotational shaft can therefore be changed in relation to the action lever arm as well as to the mounting.

Preferably, the first adjustment means comprises an arm shaft, which is supported in the action lever arm, and first cam plates, which are connected to the arm shaft and the rotational shaft, so that a relocation of the rotational shaft in relation to the action lever arm results from a rotation of the first cam plates.

Preferably, the second adjustment means comprises a support pin, which is connected to the mounting, and second cam plates, which are connected to the support pin and the rotational shaft, so that a relocation of the rotational shaft in relation to the mounting results from a rotation of the second cam plates.

Preferably, the first cam plates comprise first cam slots, though which the rotational shaft extends, and the second cam plates comprise second cam slot, through which the support pin extends.

Preferably, the rotational shaft is attached to the second cam plates and slideably arranged through the first cam slots, so that the rotational shaft is functional connected to both adjustment means.

Using elongated slots and cam plates is a very robust and low-maintenance possibility for displacing axes within elongated slots. Moreover, when two cam plates are connected to an axis with torsional connection, a very simple parallel guide can be provided. Moreover, it is advantageous that a cam plate is actuated by rotational movement which is very easily possible by an electric motor or a hand wheel.

The form of the cam slots is given by the length of the displacement/relocation of the rotational axis. The cam slots can have different shapes, preferably, however, the first and the second cam slots have the same shape and length. Herein, it is to be noted that the first and the second cam plates can be built into the actuation lever in different orientations despite their identical shapes.

Preferably, the first and the second cam plates are rotated by the same rotation angle during adjustment of the rotational shaft in order to maintain the position of the action lever arm in relation to the mounting.

The drive of the first and/or the second cam plates is preferably effected by means of an electric motor or manually.

The first and/or the second cam plates are preferably driven either by means of a toothed wheel gearing, a spindle gearing, a cam gearing, a chain drive, a belt drive, a V-belt drive, a flexible shaft, or by a combination of said gearings.

The action lever is preferably a part of a hand-brake lever. In another preferred embodiment of the invention, the action lever is part of a pedal, preferably of a pedal for a motor vehicle.

The pedal can preferably be a pedal, which can be adjusted in its dimensions to the user and wherein the action lever can be adjusted, so that the actuation force and the actuation path of the pedal remain constant despite the geometrical adjustment to the user. In that case the actuation conditions, i.e. the actuation feeling of the pedal remain constant independent from the geometrical adjustment.

In another embodiment the pedal can again preferably be a pedal, which can be adjusted in its dimensions to the user and wherein the action lever can be adjusted, so that the actuation force can also be adjusted to the user. In this case the actuation conditions, i.e. the actuation feeling of the pedal can be varied. The pedal can be adjusted to have a more soft or a more hard actuation feeling.

Preferably, the rotational shaft is independent from a geometrical adjustment means of the pedal. That means, that the geometrical adjustment is independent from the adjustment of the lever arm. In other words, for example the distance of a pedal to the user can be adjusted independently from its actuation feeling.

Preferably, a common actuation means is used for adjustment of the pedal to the user and for actuation of the first and second adjustment means.

In another embodiment at least two actuation means are used for adjustment of the pedal to the user and for actuation of the first and second adjustment means, wherein the actuation means are controlled by a control electronics.

Preferably, at least two of the pedals are arranged to form a pedal unit, wherein the first and second adjustment means of the action levers can be jointly driven for joint adjustment.

Only a single, common actuation means is preferably used for actuation of the first and second adjustment means of the pedals of a pedal unit.

Further preferred embodiments of the invention result from the subclaims.

SHORT DESCRIPTION OF THE DRAWINGS

Figure 2:
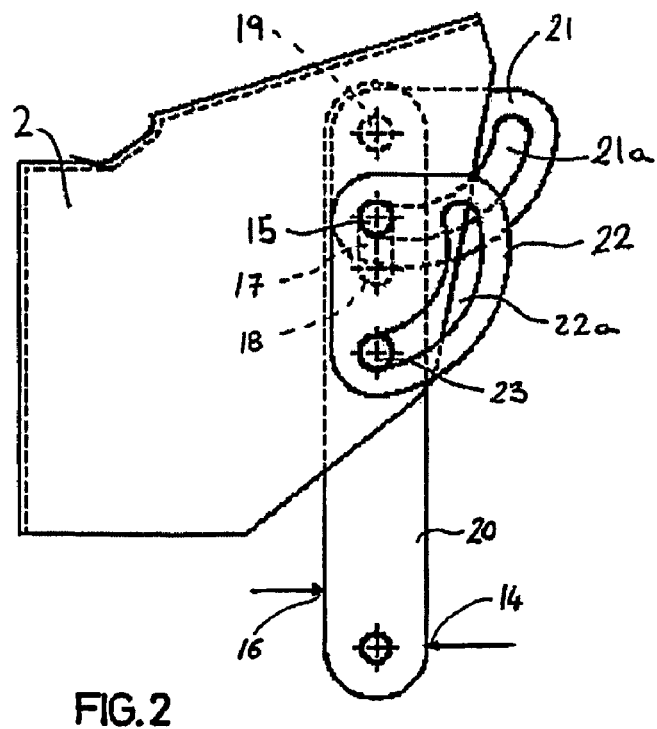
Figure 3:
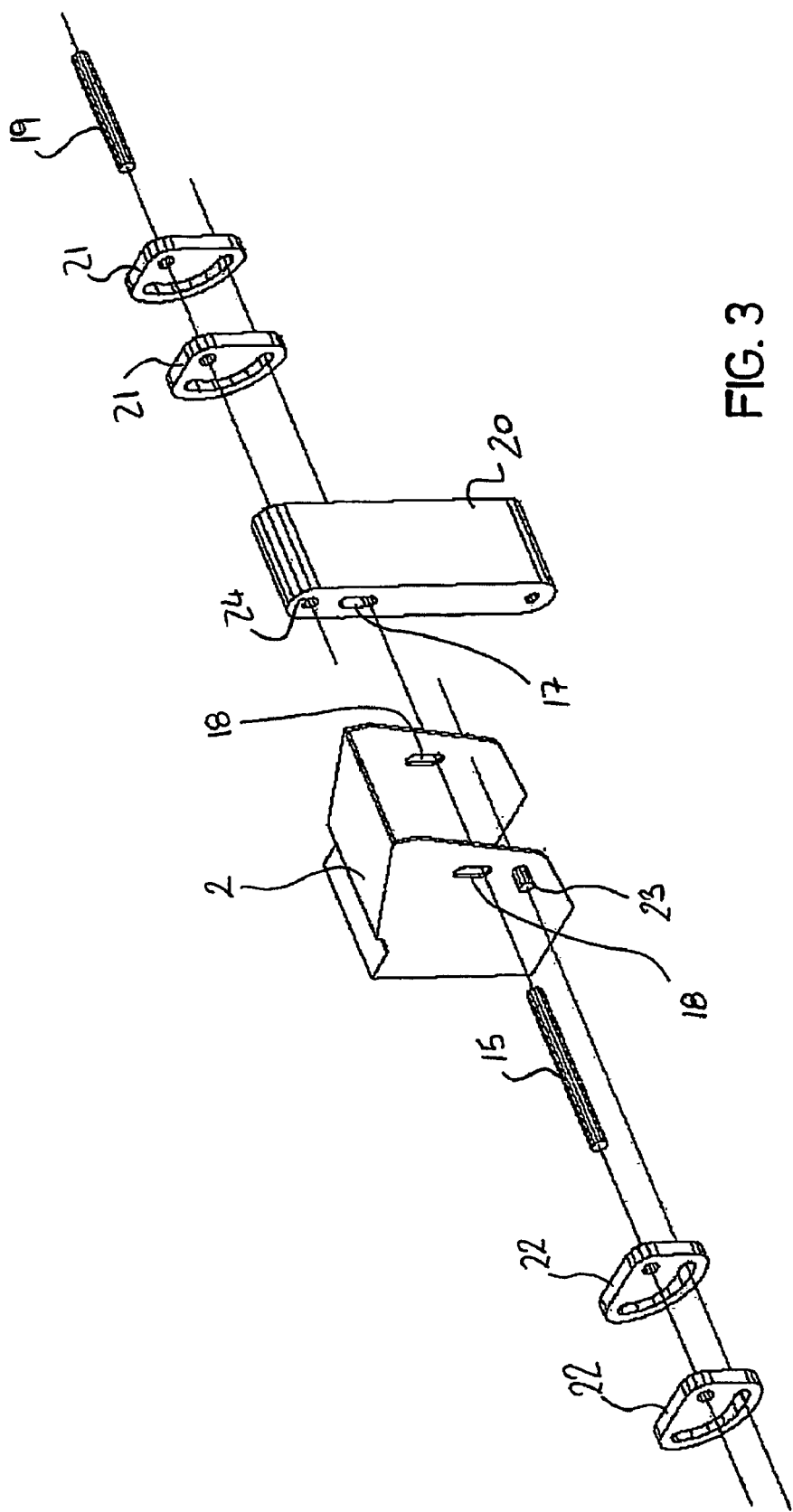
Figure 4:
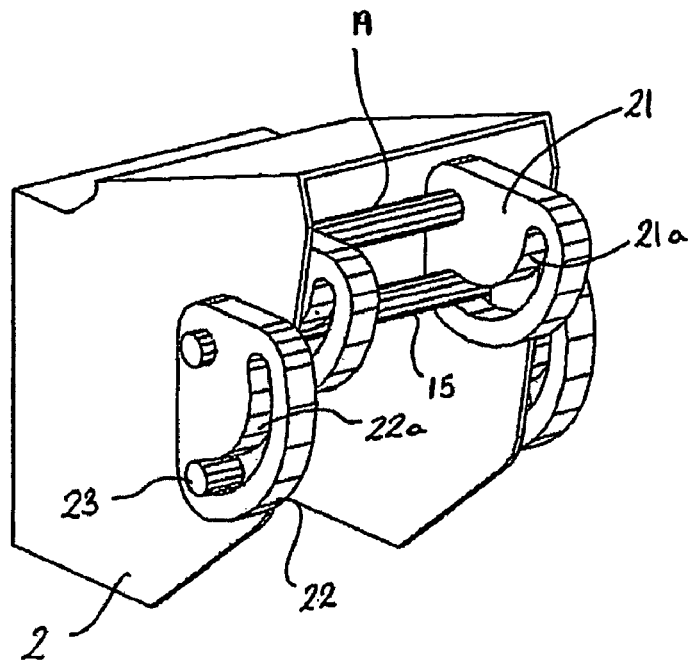
Figure 5:
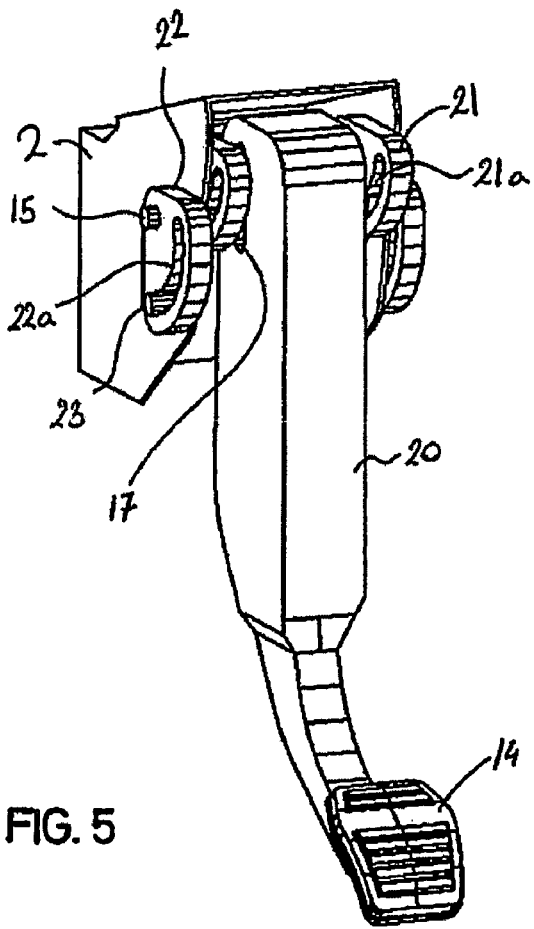
Figure 6:
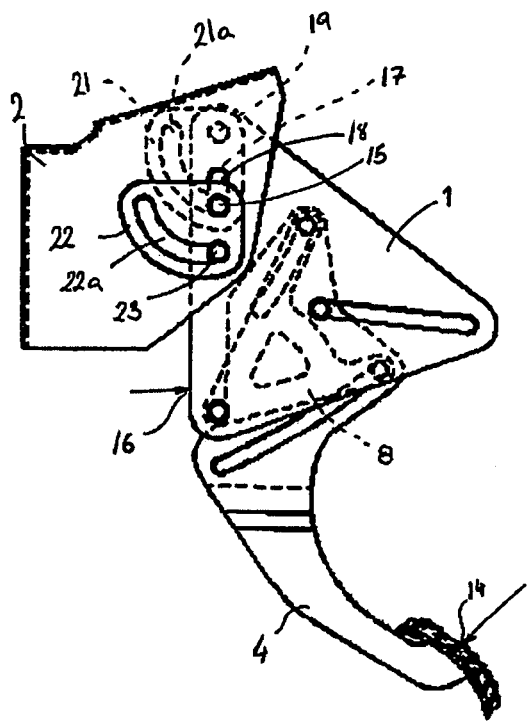
Figure 7:
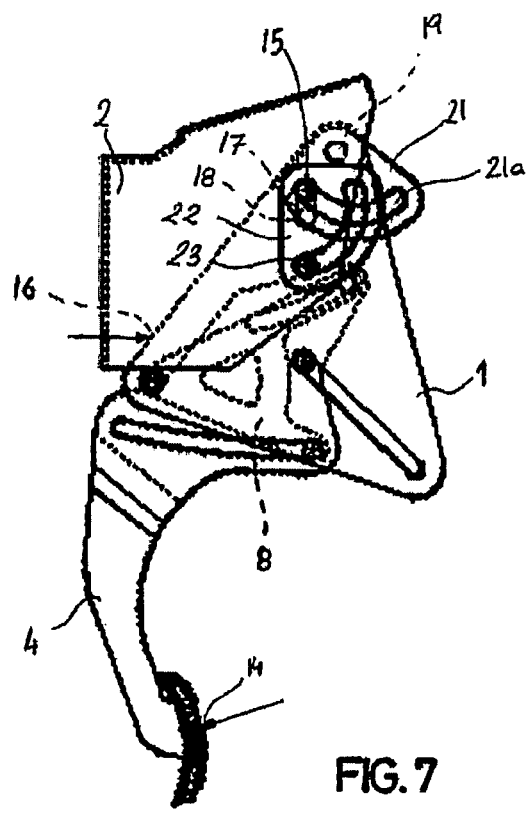

In the following, the preferred embodiments of the present invention are described with reference to the drawings. Therein shows:

FIG. 1 a side view of a preferred embodiment of an action lever according to the invention, wherein the action lever is adjusted, so that it has shorter lever arms;

FIG. 2 a side view of the preferred embodiment of an action lever of FIG. 1, wherein the action lever has been adjusted, so that it has larger lever arms;

FIG. 3 a three-dimensional explosional view of the preferred embodiment of an action lever according to FIG. 1;

FIG. 4 a three-dimensional view of the adjustment mechanism of an adjustable action lever, wherein the action lever arm is not shown;

FIG. 5 a three-dimensional view of a pedal according to a preferred embodiment of the invention;

FIG. 6 a side view of another embodiment of the invention in the form of a pedal, which is geometrically adjustable to the driver;

FIG. 7 a side view of the pedal of FIG. 6 during actuation.

DETAILED DESCRIPTION OF THE PREFERRED EMBODIMENTS

The present preferred embodiment describes an action lever according to the invention particularly for manual actuation, allowing a variation of the lever ratio. On the one hand, this is to make it possible to adjust the ratio of the action lever to an individual user and on the other hand, if a geometrical adjustment of the action lever to a user has been effected, the ratio of the action lever can kept constant.

In FIGS. 1 to 4, a first embodiment of an action lever of the present invention is shown. The action lever consists substantially of an action arm 20, pivotably supported in the fixed support 2 by means of a rotational shaft 15. On the action lever arm 20, a first force-inducing point 14 is provided, where an input force $F_1$ is passed into the action lever arm 20, as well as a second force-inducing point 16, where an output or reaction force $F_2$ is passed into the action lever arm 20. It is possible to induce shearing forces and forces of pressure as well as moments of torsion at the shown force-inducing points. In the FIGS. 1 and 2 the forces $F_1$ and $F_2$ are represented by arrows at the reference numbers 14 and 16.

The force-inducing points 14 and 16 represent an arbitrary number of points on arbitrary positions of the arm, where various forces can be induced in the action lever arm 20. For facilitating this illustration, it is supposed herein that the forces $F_1$ and $F_2$ are forces of pressure in the direction shown in FIGS. 1 and 2. The input force $F_1$ (at reference number 14) might e.g. be the force of pressure transmitted to a brake pedal by the foot of a driver. In the example of a brake pedal, the output force $F_2$ (at reference number 16) would be the force which is transmitted to the main brake cylinder by the brake pedal.

In the example shown in FIG. 1, the output force $F_2$ has a smaller lever action lever arm with regard to the rotational shaft 15 in comparison to the input force $F_1$. If supposing for purpose of facilitation, that the rotational shaft 15 does not take up moments of torsion, and that the loss by friction etc. is small, it results that the amount of the output force $F_2$ will exceed the amount of the input force $F_1$. The amount of the input force $F_1$ multiplied with its resulting lever action lever arm equals to the output force $F_2$ multiplied with its resulting lever arm.

The resulting lever arms of the forces $F_1$ and $F_2$ are defined by the shortest distance between the symmetry axis of the rotational shaft 15 and the imaginary extension of the force vectors.

As mentioned above, the ratio of the forces $F_1$ and $F_2$ is its quotient or its relation. In the present embodiment, the ratio is the quotient of the distances of the lines of forces (the resulting lever arms) of $F_1$ and $F_2$ to the rotational shaft 15, which defines the rotation axis of the action lever arm 20. By relocating the rotational shaft 15 the distances to the lines of forces of $F_1$ and $F_2$ are varied. Thereby, also the quotient of this distances varies. That leads to a variation of the lever ratio of the action lever.

FIG. 2 shows in comparison to FIG. 1 an action lever wherein the rotational shaft 15 was displaced upwardly. Thus, the lever arm of the output force $F_2$ and also the lever arm of the input force $F_1$ in relation to this rotational shaft are increased by the same amount. Since the amount of the output force $F_2$ is proportional to the relation of the lever arms of the forces $F_1$ and $F_2$, this results in the output force $F_2$ in FIG. 2 being smaller than the output force $F_2$ in FIG. 1, given that the same input force $F_1$ is induced into the action lever arm 20. A displacement of the rotational shaft 15 thus causes a variation of the translation ratio between the forces $F_1$ and $F_2$.

As it can be seen from FIGS. 1 and 2, the absolute position of the action lever arm 20 remains the same with regard to the fixed support 2. This is achieved by the rotational axis 15 being displaced within an elongated guide 18 of the fixed support and within an elongated guide 17 of the arm. In this embodiment the elongated guides are provided as elongated holes. Accordingly, the action lever arm 20 has to be supported in its longitudinal direction. This is effected by means of a first adjustment means 19, 21, preferably comprising an arm shaft 19 and first cam plates 21. The arm shaft 19 is rotably mounted within the action lever arm 20 and its orientation corresponds to the rotational shaft 15.

The arm shaft 19 is connected to the first cam plates 21 and the arm shaft 19 rotates together with the first cam plates 21. The first cam plates 21 are provided with first cam slots 21a through which the rotational shaft 15 extends. Pivoting the first cam plates 21 results in displacing the rotational shaft 15 with regard to the action lever arm 20.

With regard to the fixed support 2, the rotational shaft 15 is displaced by means of a second adjustment means 22, 23. The second adjustment means 22, 23 comprises second cam plates 22 and at least one support pin 23. The rotational shaft 15 is connected to the second cam plates 22 so that the rotational shaft 15 rotates together with the second cam plates 22. The second cam plates 22 moreover comprise second cam slots 22a, into which the support pins 23 protrude, which are fixedly connected to the support 2. When pivoting the second cam plates 22, the position of the rotational shaft 15 can be continuously adjusted with relation to the fixed support 2.

In this configuration, it is possible to pivot the first and the second cam plates 21, 22 simultaneously so that on the one hand, the rotational shaft 15 can be displaced in the elongated guides 17 and 18, which are here provided as elongated holes, and that on the other hand the position of the action lever arm 20 is not changed with relation to the support 2. When reducing the lever arms, the distance from the rotational shaft 15 to the arm shaft 19 is increased, when increasing the lever arms, the distance from the rotational shaft 15 to the arm shaft 19 is reduced.

Since the first and the second cam plates 21, 22 are for the time being turned independently from each other, it is also possible to turn the first and the second cam plates 21, 22 not with the same amount, so that the position of the action lever arm 20 changes in relation to the mounting 2. Thereby, the resulting lever arms of the induced forces change, too.

The first and the second cam slots 21a, 22a preferably have the same shape, so that the same rotation of the first and the second cam plates 21, 22 results in the same displacement of the rotational shaft 15. As seen from the FIGS. 1 and 2, the first and the second cam plates 21, 22 comprise the same shape but are mounted twisted within the action lever.

Preferably, a rotation of the cam plates 21, 22 of 90° is sufficient to relocate the rotational shaft 15 by the necessary amount. However, also a smaller or larger rotation angle is possible if desired.

For displacing the rotational shaft 15, other devices than the afore-mentioned cam plates can be used. The rotational shaft 15 can e.g. be displaced via appropriate lever apparatuses or spindle drives.

As material for all elements of the action lever, various plastic materials or metals can be used. Preferably, the rotational shaft 15, the arm shaft 19, and the pin 23 are made of a steel. The fixed support 2 may also be preferably made of a sheet metal plate. The action lever arm 20 and the cam plates 21 and 22 are particularly preferably made of a plastic material, in particular of a glass-fiber reinforced plastic material.

As shown in FIGS. 3 and 4, the cam plates 21 and 22 are each provided in duplicate. The cam plates 21 are provided within and the cam plates 22 outside a fixed support 2, which has in this embodiment the shape of a box.

For adjustment of the action lever, the first cam plates 21 and the second cam plates 22 can be driven. Preferably, this is effected by means of an electric motor. However, a manual drive is also possible. The cam plates 21, 22 can therein be driven via an arbitrary kind of gearing. Preferably, the cam plates 21, 22 are driven via a toothed wheel gearing, a spindle gearing, a cam gearing, a chain drive, a belt drive, or a V-belt drive, a flexible shaft, or by a combination of said gearings. Therein, it is possible that motor and gearing are formed in that both cam plates 21, 22 are moved together. However, it is also possible to provide one gearing and one motor for each pair of the cam plates 21, 22. Then, independent adjustment is possible, thus making it is possible to change the length of the lever 20 if desired.

FIG. 5 shows another preferred embodiment of this invention, wherein the action lever is part of a pedal, preferably of a pedal for a motor vehicle. In this embodiment and in the embodiment for a hand brake lever, the brake path and the brake force, to be applied by a driver, can be adjusted individually by means of the adjustable action lever. In the embodiment of FIG. 5 the action lever arm 20 corresponds to the arm of the pedal and the force inducing point 14 of the input force $F_1$ corresponds to a foot-piece of the pedal.

Another embodiment results if a pedal adjustable to the user's seating position is used instead of the conventional pedal of FIG. 5, as shown in FIGS. 6 and 7.

The pedal of FIGS. 6 and 7 can in addition to the adjustment of the lever arm also be geometrically adjusted. In this embodiment, the pedal's action lever arm consists of substantially only three parts, namely a subpedal 1, a positioning element 8 and a pedal foot 4. The subpedal 1 is pivotably mounted at the rotational shaft 15 of the ratio regulating mechanism. The pedal foot 4 is slideably arranged at the subpedal 1 by means of an elongated guide. The positioning element 8 is pivotably mounted at the subpedal 1 and slideably mounted at the pedal foot 4. By actuating the positioning element 8 or the pedal foot 4, the pedal foot 4 glides relatively to the subpedal 1 during a pivoting of the positioning element 8. The element, that has to be actuated, for example a braking cylinder, is connected to the subpedal 1.

Such an geometrical adjustable pedal is explained in detail in another patent application of the same applicant.

It is to be noted, that in this embodiment the ratio regulating mechanism is independent from the mechanism for the geometrical adjustment. In particular, the rotational shaft 15 is independent from the means for the geometrical adjustment of the pedal.

During the geometric adjustment of such a pedal, the action lever arm is usually changed. Thus, the actuating force and the actuating path are also changed, e.g. for actuating the brake. Thus, a small driver, whose brake pedal is adjusted to be long, has to apply a larger actuating path to the foot piece of the pedal in order to create the same braking force in comparison to the short actuation path of a short pedal. This effect can be compensated by an adjustable action lever according the invention. Thus, actuation force and actuation path (the actuation feeling) of the pedal are constant despite the geometric adjustment to the user.

On the other hand it may particularly desired to adjust the actuation force and actuation path (the actuation feeling) of the pedal. In that case the ratio adjustment mechanism can be used to perform such a function. The pedal can then be adjusted to have a softer or a harder actuation feeling.

The geometric adjustment of the pedal and the adjustment of the lever action lever arm are preferably done simultaneously. A common actuation means (e.g. an electric motor) can used when an appropriate gearing is used. However, it is of course also possible to use a separate actuation means for each possibility of adjustment. The lever action lever arm can then be adjusted independently of the adjustment to the driver. However, if now a compensation of actuation force and actuation path has to be effected, the actuation means have to be controlled by a control electronics, so that for each desired position of the pedal the appropriate position of the compensation is selected.

FIG. 7 shows, how the sub pedal 1, which here corresponds to the action lever arm 20, rotates around the rotational shaft 15 during the actuation of the pedal. It can also be seen, that the first adjustment means 19, 21 rotates together with the sub-pedal 1 or the action lever arm 20 during actuation.

In another embodiment of the invention, at least two pedals are grouped into a pedal unit, wherein the adjustment means of the different action levers of the pedals are jointly driven for even adjustment. Preferably, a single common adjustment element is used, e.g. a motor with a gearing.

The invention claimed is:

1. A ratio regulating mechanism for a manually actuated action lever, comprising:
   a mounting comprising a first elongated guide;
   an action lever arm comprising a second elongated guide;
   a rotational shaft for rotatably mounting the action lever arm to the mounting, wherein the rotational shaft is relocatably mounted within the first elongated guide of the mounting and the second elongated guide of the action lever arm;
   a first adjustment means for relocating the rotational shaft relative to the action lever arm, the first adjustment means comprising an arm shaft supported in the action lever arm and first cam plates connected to the arm shaft and the rotational shaft, so that an adjustment rotation of the first cam plates relocates the rotational shaft relative to the action lever arm; and
   a second adjustment means for relocating the rotational shaft relative to the mounting, the second adjustment means comprising a support pin connected to the mounting, and second cam plates connected to the support pin and the rotational shaft, so that an adjustment rotation of the second cam plates relocates the rotational shaft relative to the mounting.

2. The ratio regulating mechanism of claim 1, wherein the first adjustment means and the second adjustment means are adjustable, so that a position of the action lever arm with respect to the mounting is maintained during relocation of the rotational shaft.

3. The ratio regulating mechanism of claim 1, wherein the first adjustment means relocates the rotational shaft in a first direction and the second adjustment means relocates the rotational shaft in a second direction opposite the first direction.

4. The ratio regulating mechanism of claim 1, wherein the first adjustment means and the second adjustment means are simultaneously actuated.

5. The ratio regulating mechanism of claim 1, wherein the first cam plates comprise first cam slots through which the rotational shaft extends, and the second cam plates comprise second cam slots through which the support pin extends.

6. The ratio regulating mechanism of claim 5, wherein the rotational shaft is attached to the second cam plates and slideably arranged through the first cam slots, so that the rotational shaft is functionally connected to both the first and the second adjustment means.

7. The ratio regulating mechanism of claim 5, wherein the first and second cam slots have substantially the same shape and length.

8. The ratio regulating mechanism of claim 1, wherein the first and second cam plates are rotated by a same rotation angle during adjustment of the rotational shaft.

9. The ratio regulating mechanism of claim 1, wherein at least one set of cam plates selected from a group of cam plate sets comprising the first cam plates and the second cam plates is driven by an electric motor.

10. The ratio regulating mechanism of claim 1, wherein at least one set of cam plates selected from a group of cam plate sets comprising the first cam plates and the second cam plates is manually driven.

11. The ratio regulating mechanism of claim 10, wherein at least one set of cam plates selected from a group of cam plates comprising the first cam plates and the second cam plates is driven by at least one gearing selected from a group of gearings comprising a toothed wheel gearing, a spindle gearing, a cam gearing, a chain drive, a belt drive, a V-belt drive, and a flexible shaft.

12. The ratio regulating mechanism of claim 1, wherein the ratio regulating mechanism is part of a hand-brake lever.

13. The ratio regulating mechanism of claim 1, wherein the ratio regulating mechanism is part of a pedal for a motor vehicle.

14. The ratio regulating mechanism of claim 13, wherein the pedal has dimensions adjustable to a user and wherein the action lever is adjustable to maintain a substantially constant actuation force and actuation path of the pedal across a range of pedal dimensions.

15. The ratio regulating mechanism of claim 13, wherein the pedal has dimensions adjustable to a user and wherein the action lever is adjustable to vary an actuation force of the pedal.

16. The ratio regulating mechanism of claim 15, wherein the rotational shaft maintains a position independent from a position of the pedal.

17. The ratio regulating mechanism of claim 13, wherein a common actuation means is used for geometrical adjustment of the pedal to the user and for actuation of the first and second adjustment means.

18. The ratio regulating mechanism of claim 13, wherein at least two actuation means are used for geometrical adjustment of the pedal to the user and for actuation of the first and second adjustment means, wherein the actuation means are controlled by a control electronics.

19. The ratio regulating mechanism of claim 13, further comprising at least a second pedal so that the pedal and the second pedal are arranged to form a pedal unit, wherein the first and second adjustment means of the action lever are jointly driven for joint adjustment.

20. The ratio regulating mechanism of claim 19, wherein only a single, common actuation means actuates the first and second adjustment means.

* * * * *